United States Patent
Moine et al.

(10) Patent No.: US 11,142,305 B2
(45) Date of Patent: Oct. 12, 2021

(54) UNDERCARRIAGE HAVING A SLOTTED STRUT

(71) Applicant: SAFRAN LANDING SYSTEMS, Velizy Villacoublay (FR)

(72) Inventors: Daniel Moine, Velizy Villacoublay (FR); Hervé Rolinat, Velizy Villacoublay (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 321 days.

(21) Appl. No.: 16/265,041

(22) Filed: Feb. 1, 2019

(65) Prior Publication Data
US 2019/0241256 A1    Aug. 8, 2019

(30) Foreign Application Priority Data

Feb. 2, 2018   (FR) ...................................... 1850904

(51) Int. Cl.
*B64C 25/26*    (2006.01)
*B64C 25/14*    (2006.01)
(Continued)

(52) U.S. Cl.
CPC .............. *B64C 25/26* (2013.01); *B64C 25/14* (2013.01); *B64C 25/22* (2013.01); *B64C 25/34* (2013.01)

(58) Field of Classification Search
CPC .......... B64C 25/14; B64C 25/26; B64C 25/20
See application file for complete search history.

(56) References Cited

U.S. PATENT DOCUMENTS 2,355,210 A * 8/1944 Eddy ....................... B64C 25/14
                                                      244/109
2,661,171 A * 12/1953 Allen ...................... B64C 25/26
                                                      244/102 SL
(Continued)

FOREIGN PATENT DOCUMENTS

EP     1 988 015 A1   11/2008
FR     2 928 623 A1    9/2009
(Continued)

OTHER PUBLICATIONS

Preliminary Search Report from the Institut National De La Propriété Industrielle, dated May 18, 2018 for French Application No. 1850904, filed Feb. 2, 2018, 2 pages.

*Primary Examiner* — Richard R. Green
*Assistant Examiner* — Madison Elizabeth Dittner
(74) *Attorney, Agent, or Firm* — Christensen O'Connor Johnson Kindness PLLC

(57) ABSTRACT

An aircraft undercarriage having a leg for mounting to move on an aircraft structure between a deployed position and a retracted position is provided. The undercarriage generally includes a brace member arranged between the structure of the aircraft and the leg in order to stabilize the leg in the deployed position, and a drive actuator for moving the leg from the deployed position to the retracted position. The brace member includes a strut arm having a proximal end that is designed to be hinged on the structure of the aircraft. The arm presents a longitudinal slot extending until the slot reaches a distal end in order to terminate in a bend and having slidably engaged therein a finger that is secured to the leg, the drive actuator being coupled to the strut arm.

3 Claims, 4 Drawing Sheets

(51) Int. Cl.
 *B64C 25/22* (2006.01)
 *B64C 25/34* (2006.01)

(56) References Cited

U.S. PATENT DOCUMENTS

| | | | | |
|---|---|---|---|---|
| 7,967,245 | B2 * | 6/2011 | Seror-Goguet | B64C 25/26 |
| | | | | 244/102 SL |
| 8,770,514 | B2 * | 7/2014 | Brighton | B64C 25/20 |
| | | | | 244/102 R |
| 8,820,679 | B2 * | 9/2014 | Martinez | B64C 25/10 |
| | | | | 244/102 SL |
| 10,124,884 | B2 * | 11/2018 | Walke | F16H 25/14 |
| 10,196,132 | B2 * | 2/2019 | Schmidt | B64C 25/12 |
| 2015/0203192 | A1 * | 7/2015 | Slanker | B64C 25/12 |
| | | | | 244/102 R |

FOREIGN PATENT DOCUMENTS

| | | | | |
|---|---|---|---|---|
| GB | 463739 | A * | 4/1937 | B64C 25/14 |
| GB | 518020 | A * | 2/1940 | B64C 25/20 |
| GB | 628324 | A * | 8/1949 | B64C 25/20 |
| WO | 2010/139756 | A1 | 12/2010 | |

\* cited by examiner

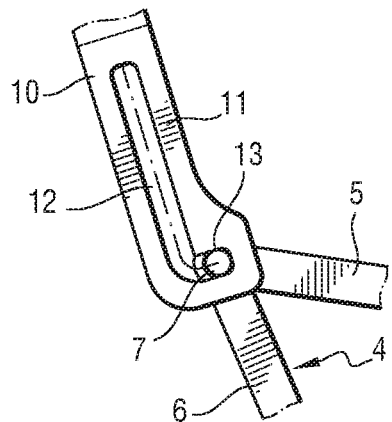
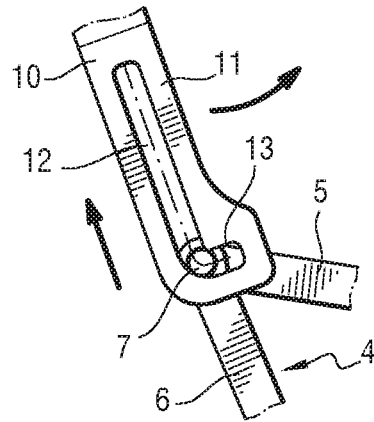
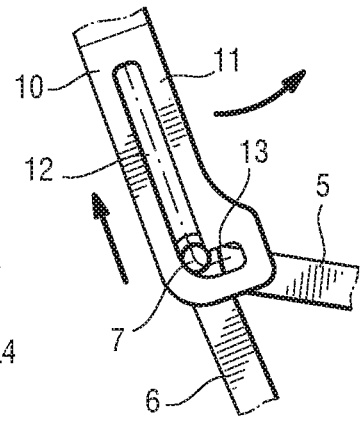
Fig. 4A   Fig. 4B   Fig. 4C
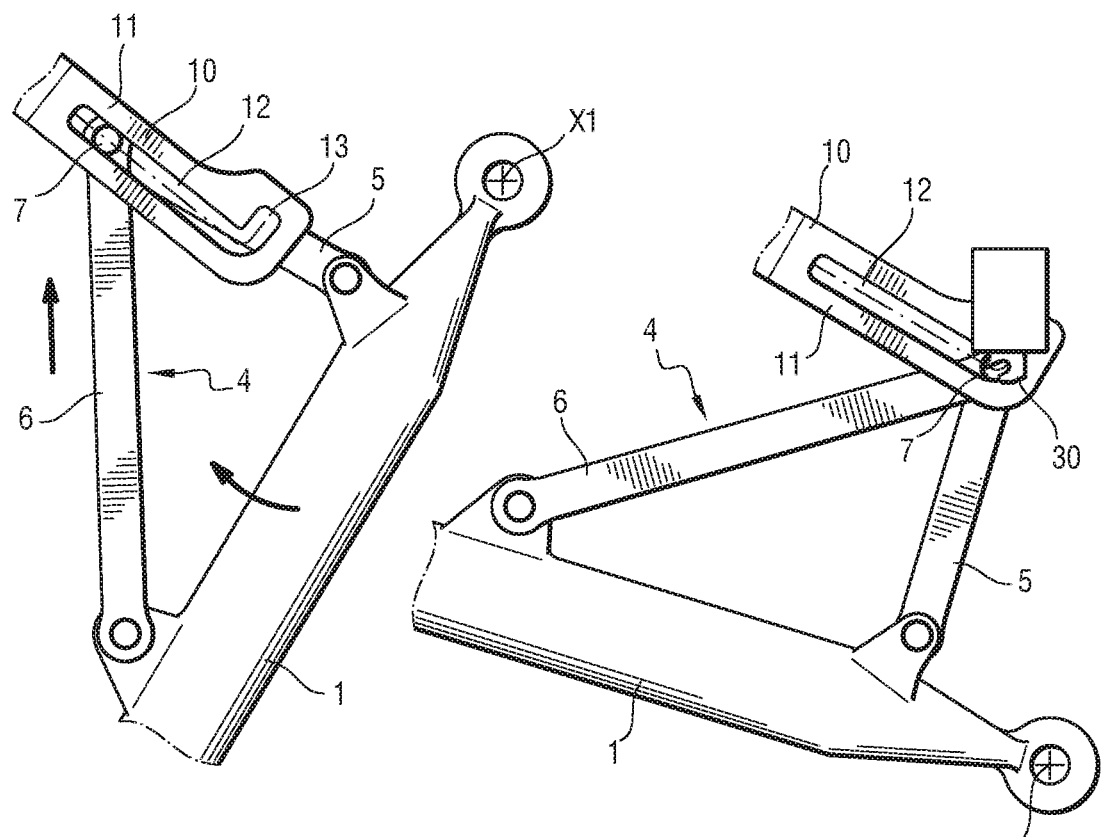
Fig. 4D   Fig. 4E

UNDERCARRIAGE HAVING A SLOTTED STRUT

BACKGROUND

Undercarriages generally include a leg that is mounted to be movable on an aircraft structure between a deployed position and a retracted position. The leg is stabilized in the deployed position by a brace member that can be locked when the leg arrives in the deployed position, and that can be unlocked to enable the leg to be retracted until it reaches the retracted position.

Various types of strut are used in undercarriages, including foldable struts comprising two hinged elements that are held in an aligned position by a stabilization member forming a lock (itself often comprising two arms held in the aligned position by a spring member), or also telescopic struts fitted with an internal blocking member forming a lock. Locking is generally automatic when the leg arrives in the deployed position and is held by a spring member.

Such an undercarriage requires an unlocking actuator in order to neutralize the lock of the strut, and a drive actuator to bring the leg back towards the retracted position. Configurations of the drive actuator are also known that enable it to both neutralize the locking member and to raise the leg towards the retracted position, which makes it possible to remove the unlocking actuator. For a folding strut, such a configuration leads to coupling the drive actuator with one of the arms of the stabilization member, which leads to linkages that are complex.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one or more aspects of the present disclosure, there is provided an aircraft undercarriage comprising a leg carrying at least one wheel and for mounting to move on an aircraft structure between a deployed position and a retracted position, the undercarriage including a brace member arranged between the structure of the aircraft and the leg in order to stabilize the leg in the deployed position, and a drive actuator for moving the leg from the deployed position to the retracted position. According to the present disclosure, the brace member comprises a strut arm having a proximal end that is designed to be hinged on the structure of the aircraft, the arm presenting a longitudinal slot extending until it reaches a distal end in order to terminate in a bend and having slidably engaged therein a finger that is secured to the leg, the drive actuator being coupled to the strut arm.

In accordance with one or more aspects of the present disclosure, there is provided an aircraft undercarriage. The aircraft undercarriage generally includes a leg movably mountable to an aircraft structure and carrying at least one wheel, the leg movable between a deployed position and a retracted position; a brace member comprising a strut arm having a proximal end configured to be hinged on the structure of the aircraft, the strut arm having a longitudinal slot extending until the slot reaches a distal end and terminates in a bend, the slot having a finger slidably engaged therein and secured to the leg, the brace member arranged between the structure of the aircraft and the leg and configured to stabilize the leg in the deployed position; and a drive actuator coupled to the strut arm for moving the leg from the deployed position to the retracted position.

Thus, in some embodiments, the leg is stabilized in the deployed position by the finger of the leg engaging in the bend of the slot in the arm of the brace member. The action of the drive actuator on the arm of the brace member gives rise firstly to the finger exiting the bend, thus unlocking the leg, and then raising the leg by sliding of the finger along the slot.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIGS. 4A to 4E are fragmentary diagrammatic views of the strut arm and of a portion of the leg of the undercarriage during a raising stage.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
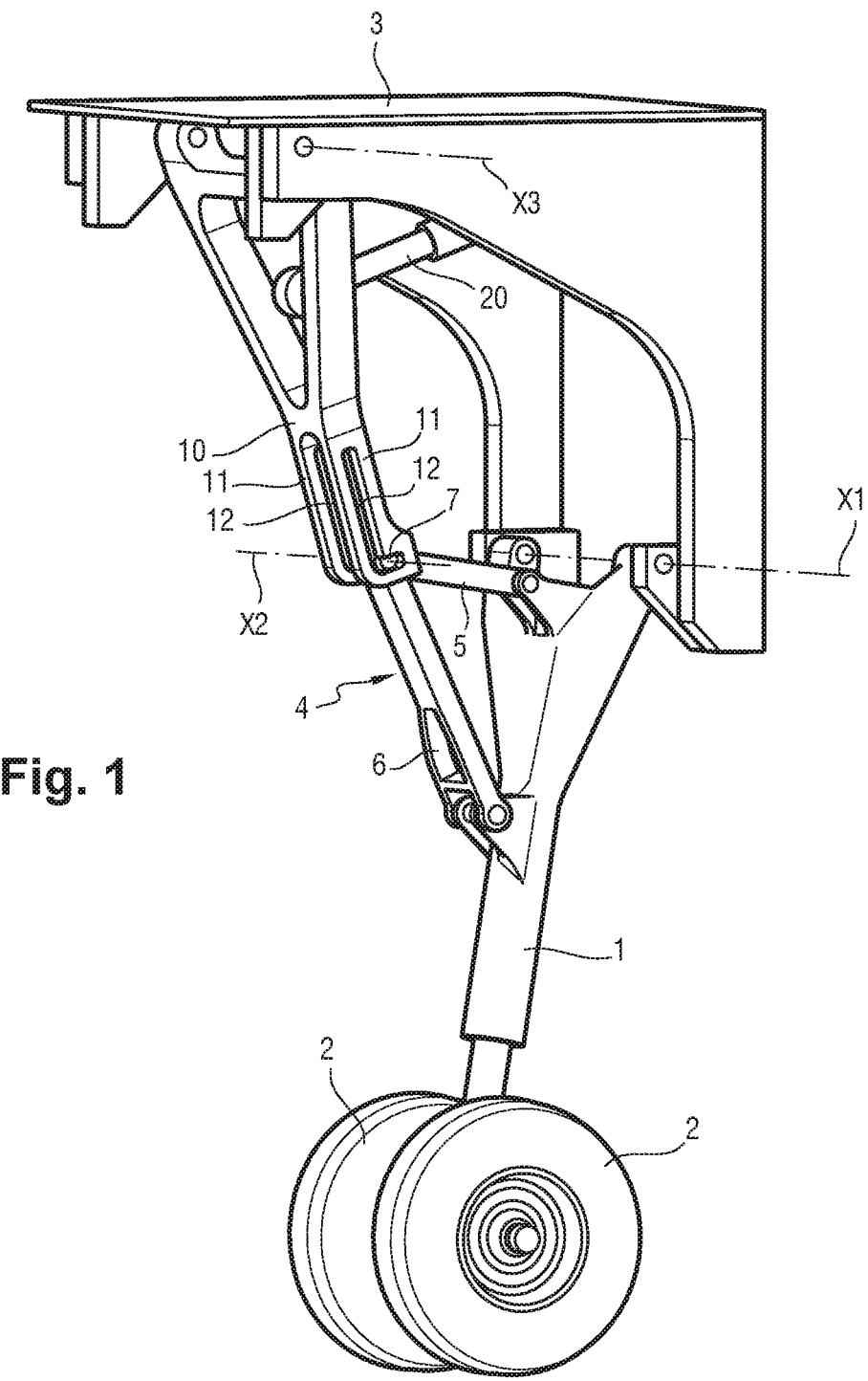
FIG. 1 is a perspective view of an embodiment of an aircraft undercarriage in accordance with aspects of the present disclosure, shown in the deployed position.
Figure 2:
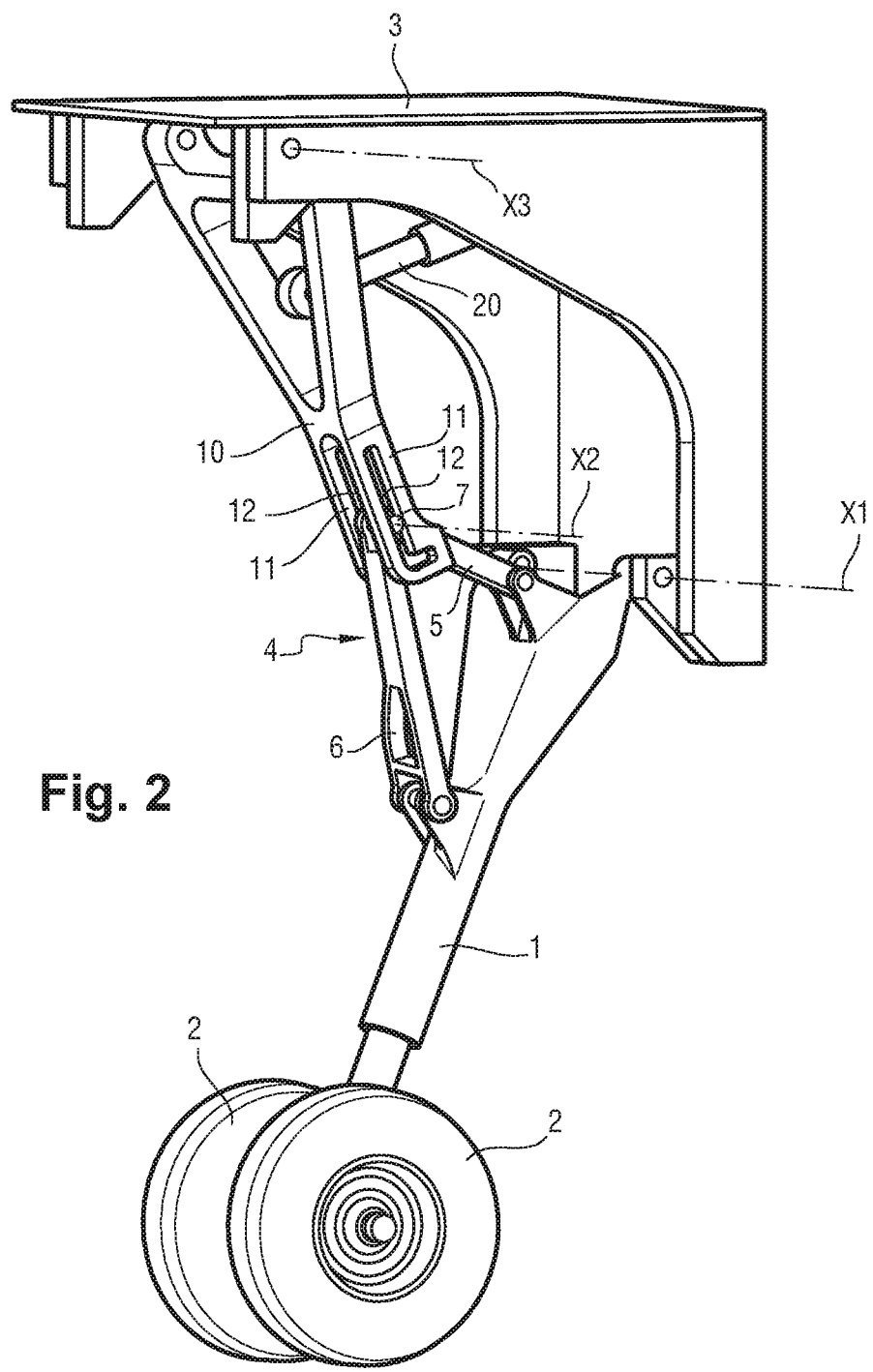
FIG. 2 is a perspective view of the FIG. 1 undercarriage, shown being raised towards the retracted position.
Figure 3:
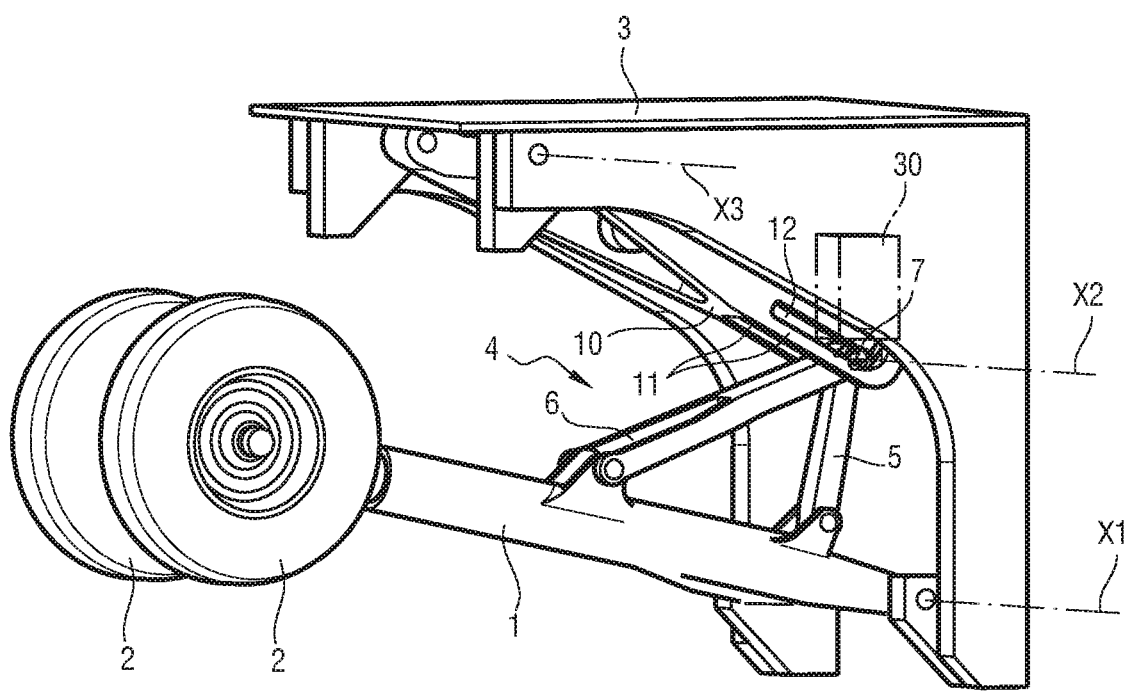
FIG. 3 is a perspective view of the FIG. 1 undercarriage, shown in the retracted position.

FIG. 1 shows an aircraft undercarriage comprising a leg 1 carrying wheels 2 at its bottom portion and hinged at its top portion to a structure 3 of the aircraft about a hinge axis X1. The leg is pivotable about said hinge axis between a deployed position shown in FIG. 1 and a retracted position shown in FIG. 3. The leg 1 includes a structure 4 made of two supports 5 and 6 fitted on the leg 1 in order to form a pyramid that carries at its apex a finger 7 extending along an axis X2 that is parallel to the hinge axis X1.

In some embodiments, the undercarriage further comprises a strut arm 10 having a proximal end hinged onto the structure of the aircraft about a hinge axis X3 that is parallel to the hinge axis X1, and having a distal portion that is hollow at its center in order to leave two parallel sides 11 extending substantially along a plane that is normal to the hinge axis X3, each side including a longitudinal slot 12 oriented substantially in a direction intersecting the hinge axis X3. Each slot is terminated by a bend 13 extending substantially perpendicularly to the rest of the slot 12. The apex of the structure 4 of the leg 1 extends between the parallel sides 11 and the finger 7 is engaged in the slots 12. Thus, the arms of the strut arm 10 and the leg 1 are dynamically connected by the finger 7 being slidable received in the slots 12. Pivoting of the strut arm 10 is thus linked with pivoting of the leg 1. Finally, a drive actuator 20, in this example a hydraulic jack is coupled to the strut arm 10.

The process of raising of the undercarriage is explained below with reference to FIGS. 4A to 4E. In the deployed position illustrated in FIG. 4A (also in FIG. 1), it can be seen that the finger 7 is held engaged at the end wall of the bend 13, thus preventing the leg 1 from pivoting about the hinge axis X1, which therefore has the effect of bracing and thus stabilizing the leg 1 in the deployed position. Having the finger 7 held at the end wall of the bend 13 ensures that the leg 1 is locked in the deployed position, and this may be done by the drive actuator 20 remaining activated in order to hold the finger 7 against the end wall of the bend 13, or by a spring member acting on the strut arm 10 in order to hold it in the position shown in FIG. 4A.

In order to raise the leg 1, and as shown in FIG. 4B, the drive actuator 20 is activated so as to pull on the strut arm 10 and cause it to pivot (in the direction of the arrow), initially having the effect of causing the finger 7 to exit the bend 13. The leg 1 is thus unlocked and able to pivot about its hinge axis X1. As pivoting of the strut arm 10 continues under the action of the drive actuator 20, the finger 7 engages in the slots 12 as shown in FIG. 4C, thus beginning raising of the leg 1 towards its retracted position. Then, the finger 7 slides in the slots 12 until it reaches a maximum excursion shown in FIG. 4D, which takes place when the slots 12 converge towards the hinge axis X1 of the leg 1.

With continued pivoting of the strut arm 10, the leg 1 continues its stroke towards the retracted position, but the finger 7 then moves back towards the bend 13, until one of the ends of the finger 7 projecting from one of the slots 12 is hooked by a locking hook 30 that is secured to the structure of the aircraft. The leg 1 is then held stationary in the retracted position. The finger thus performs two functions, both as a sliding connection with the strut arm, and also as an attachment member for locking the leg in the retracted position.

For lowering the leg 1 towards the deployed position, it suffices to cause the hook 30 to release the finger 7. The leg 1 then moves downwards under the effects of its own weight and of aerodynamic forces, it being possible to use the raising actuator 20 to regulate the downward speed of the leg 1. The leg continues to move downwards until it reaches the deployed position in which the finger 7 engages automatically against the end wall of the bend 13. The leg is then locked in the deployed position. A spring member (not shown) acts on the strut arm 10 in such a manner that the finger 7 remains engaged against the end wall of the bend 13, which has the effect of holding the leg 1 locked in the deployed position.

The present disclosure is not limited to the above description but, on the contrary, covers any variant coming within the ambit defined by the claims. In particular, there is shown an undercarriage having a leg and a brace member that are hinged on the structure of the aircraft about parallel hinge axes. In more general manner, embodiments of the present disclosure apply to an undercarriage having a leg that is movable between a deployed position and a retracted position, and having a brace member that is linked to move with the moving leg by a finger of the leg sliding in a slot of the brace member. Furthermore, although in this example the slots extend in parallel sides in such a manner that the structure carrying the finger extends between the sides, other known types of slot/finger connection could be used, such as for example a central slot extending between two supports of the leg carrying the finger. The finger could possibly be split into two parts.

Although in this example, the slot is essentially rectilinear, the slot could take on other configurations in order to facilitate raising of the leg. However, it is important for the slot to be terminated by a bend that provides locking of the leg, at least in the deployed position.

Although in this example, the finger also serves to lock the leg in the retracted position, that locking could be performed by other means, e.g. by a roller that is secured to the leg or to the strut arm and that is hooked by a hook when the leg arrives in the retracted position.

Finally, although in this example the drive actuator shown is a linear actuator coupled to the brace member, any other type of drive actuator could be used, such as a rotary electromagnetic actuator placed on the hinge of the brace member.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. An aircraft undercarriage, comprising:
   a leg movably mountable to an aircraft structure and carrying at least one wheel, the leg movable between a deployed position and a retracted position;
   a brace member comprising a strut arm having a proximal end configured to be hinged on the aircraft structure, the strut arm having a longitudinal slot extending until the slot reaches a distal end and terminates in a bend, the slot having a finger slidably engaged therein and secured to the leg, the brace member arranged between the structure of the aircraft and the leg and configured to stabilize the leg in the deployed position; and a drive actuator separate from the brace member and coupled to the strut arm for moving the leg from the deployed position to the retracted position.

2. The aircraft undercarriage of claim 1, wherein the leg and the strut arm are hinged on the structure of the aircraft about parallel hinge axes.

3. The aircraft undercarriage of claim 1, wherein the finger forms an attachment member for a hook configured to hold the leg in the retracted position.

\* \* \* \* \*